United States Patent [19]

Endo et al.

[11] Patent Number: 4,925,309

[45] Date of Patent: May 15, 1990

[54] SYSTEM AND METHOD OF INSPECTING CONNECTOR COUPLING CONDITION

[75] Inventors: Takayoshi Endo; Shigemitsu Inaba; Shigemi Hashizawa, all of Shizuoka, Japan

[73] Assignee: Yazaki Corporation, Japan

[21] Appl. No.: 270,684

[22] Filed: Nov. 14, 1988

[30] Foreign Application Priority Data

Nov. 12, 1987 [JP] Japan ................................ 62-284378

[51] Int. Cl.$^{5}$ ................................................ G01B 11/00

[52] U.S. Cl. .................................... 356/394; 358/101; 358/106

[58] Field of Search ................ 356/394; 358/101, 106; 382/8

[56] References Cited

U.S. PATENT DOCUMENTS 4,799,268 1/1989 McLean et al. ..................... 358/101

FOREIGN PATENT DOCUMENTS 53-95187 8/1978 Japan .

*Primary Examiner*—F. L. Evans

*Attorney, Agent, or Firm*—Wigman & Cohen

[57] ABSTRACT

To inspect the coupling condition of two matable connector housings, one of the connector housings is formed with a guide recessed portion on an upper surface thereof so as to be fittable to the lower end surface of an image tube, an aperture at the center of the guide recessed portion through which connector housing coupling condition can be seen, and at least one groove indicative of the connector model code; an image tube is lowered so that the lower end portion of the image tube is brought into contact with the guide recessed portion to take an image; the detected image is compared with reference patterns to check whether the connector housings are coupled normally; an alarm is generated if abnormal; and the total number of normally coupled connectors can be displayed for each connector model code.

7 Claims, 5 Drawing Sheets

SYSTEM AND METHOD OF INSPECTING CONNECTOR COUPLING CONDITION

BACKGROUND OF THE INVENTION

1. Field of the Invention

The present invention relates to a system and method of continuously inspecting coupling condition of a number of connectors automatically on a mass production process line.

2. Description of the Prior Art

An example of methods of checking whether two male and female connector housings have been perfectly coupled is disclosed in Japanese Published Unexamined (Kokai) Utility Model Appli. No. 53-95187, entitled Cable Connecting Apparatus.

In this apparatus, a reflector is provided within one of matable connector housing and a pair of optical paths are formed within the other of the connector housings so that a go-and-return optical path can be formed when the two connector housings are normally coupled. Further, a light source is arranged toward one optical path and a light receiving element is arranged toward the other optical path. Therefore, it is possible to check the perfect connector coupling condition when the light receiving element can receive light emitted from the light source.

In the prior-art connector coupling condition inspecting method, however, since the object to be inspected is an optical path formed within the two connector housings and therefore not directly related to the connector coupling condition, there exists a problem in that an optical path can be formed in spite of the fact that the two matable connector housings are not perfectly coupled, thus it being impossible to reliably inspect connector coupling conditions of many connectors at high speed.

To overcome the above-mentioned problems, it is also possible to construct a system which can directly take an image representative of connector coupling condition within one of the connector housings. In this system, however, since it is necessary to keep an accurate focus distance between the image tube and the connector housing coupling position in order to obtain a clear image, there exists a problem in that a relatively costly mechanism for precisely locating the image tube relative to the connector housings may be required.

SUMMARY OF THE INVENTION

With these problems in mind, therefore, it is the primary object of the present invention to provide a low-priced system and method of inspecting coupling condition of a number of connectors automatically on a mass production process line.

To achieve the above-mentioned object, a connector coupling condition inspecting system, according to the present invention, comprises: (a) a pair of matable connector housings constituting a connector, one of said housings being formed with a guide recessed portion on an upper surface thereof and an aperture at a center of the guide recessed portion through which connector housing coupling condition can be seen; (b) an image tube, movably fitted and brought into contact with the guide recessed portion of said housing, for taking an image representative of connector coupling condition through the aperture; (c) a first memory unit for storing reference patterns indicative of normal connector housing coupling conditions; (d) a controller, connected to said image tube and said first memory unit, for comparing an image detected by said image tube with the reference patterns stored in said first memory unit to check whether said matable connector housings are coupled normally.

When the system detects that the connector housings are coupled abnormally, alarms are produced to remove abnormally coupled connectors automatically or manually. Further, it is also possible to display the connector coupling condition where necessary. Further, when at least one groove indicative of a model code of connectors to be inspected is formed in one of the connector housings, the number of normally coupled connectors can be counted and displayed automatically on a display unit for each connector model code. Further, it is particularly preferable to form an actuator (e.g. dowel) on the upper surface of the connector housing to start the inspecting system whenever an image tube is brought into contact with the connector housing.

BRIEF DESCRIPTION OF THE DRAWINGS

The features and advantages of the system and method of inspecting connector coupling condition according to the present invention will be more clearly appreciated from the following description of the preferred embodiment of the invention taken in conjunction with the accompanying drawings in which:

FIG. 2(*b*) shows a malcoupling condition with a gap d1 between the two connector housings; and FIG. 2(*c*) shows a malcoupling condition with a gap d2 ( >d1) between the two connector housings;

DETAILED DESCRIPTION OF THE PREFERRED EMBODIMENTS

An embodiment of the system for inspecting connector coupling condition according to the present invention will be described hereinbelow with reference to the attached drawings.

Figure 1:
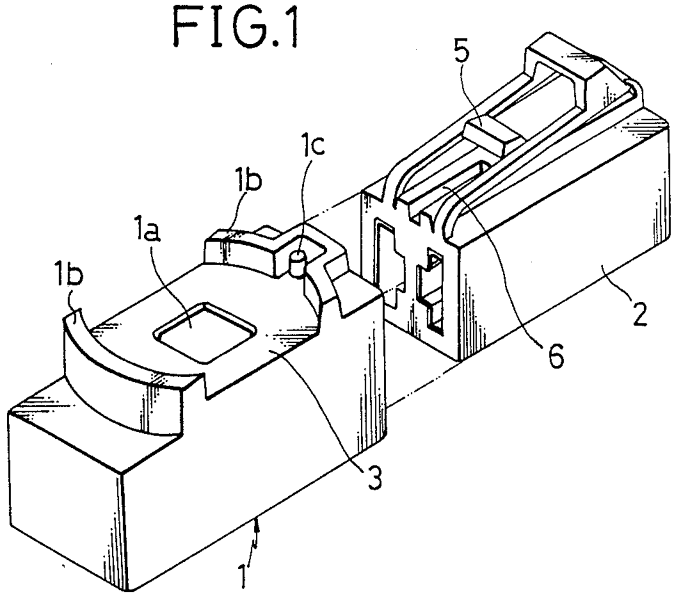
FIG. 1 is a perspective view showing a pair of matable male and female connectors to which the system and method of the present invention is applied.

FIG. 1 shows an example of connectors to which the system of the present invention is applied. The connector comprises a female connector housing 1 provided with plugs (not shown) and a male connector housing 2 provided with receptors (not shown).

The female connector housing 1 is formed with an oval-shaped recessed portion 3 and two arcuate projection portions 1*b* on the upper surface thereof. A square inspecting aperture 1*a* is formed at the center of this oval-shaped recessed portion 3, through which it is possible to inspect the coupling condition between the two male and female connector housings 1 and 2 as described in further detail with reference to FIGS. 2(*a*), (*b*) and (*c*).

Further, one of the arcuate projection **1*b* is formed with a U-shaped portion, in which a small cylindrical projection (i.e. a dowel) 1*c* is formed to start the inspecting operation. That is, a switch provided for an image tube is turned on by this dowel when the image tube is fitted to this recessed portion 3**.

Figure 2A:
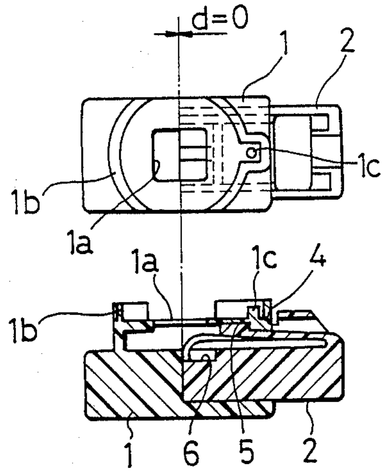
FIGS. 2(*a*), (*b*) and (*c*) are cross-sectional views showing the male and female connectors, in which FIG. 2(*a*) shows a normal coupling condition.
Figure 6:
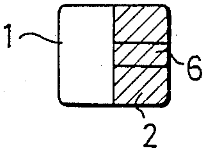
FIGS. 6(*c*), (*b*) and (*c*) show illustrations for assistance in explaining various image patterns indicative of different connector model code patterns.
Figure 6:
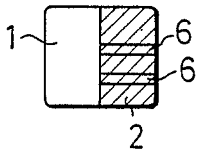
Figure 6:
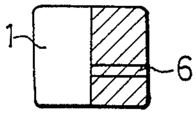

The male connector housing 2 is formed with a pivotal engage projection 5 and a code groove 6 indicative of a connector model code. This pivotal engage projection 5 is engaged with a fixed engage stepped portion 4, as shown in FIG. 2*a*, formed within the female connector housing 1, when the male connector housing 2 is perfectly coupled to the female connector housing 1. The number, the width, and the position of the code groove 6 are determined as shown in FIGS. 6(*a*), (*b*) and (*c*), for instance according to the connector housing 2. Therefore, it is possible to discriminate the model code or kinds of connectors by detecting the code groove 6.

Figure 2B:
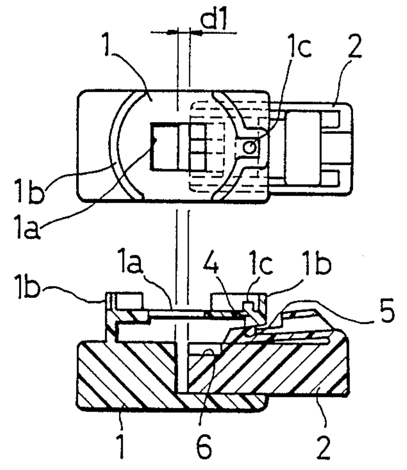
Figure 2C:
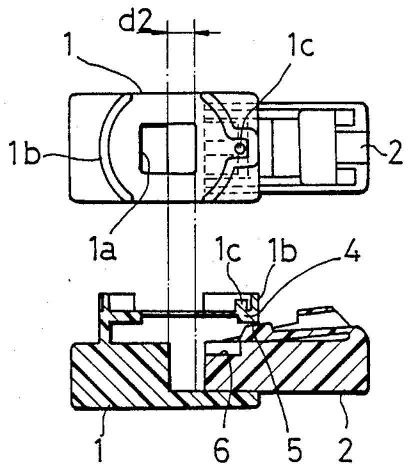

As depicted in FIGS. 2(*a*), (*b*) and (*c*), it is possible to confirm the perfect connector housing coupling condition by visually checking the innermost end of the male connector housing 2 relative to the female connector housing 1 through the inspecting aperture **1*a*. In more detail, when the two connector housings 1 and 2 are perfectly coupled with the pivotal engage portion 5 engaged with the stepped portion 4** as shown in FIG. 2(*a*), a gap between the two connector housings 1 and 2 is substantially zero (d=0); when coupled imperfectly as shown in FIG. 2(*b*), the gap between the two is d1; and when not coupled as shown in FIG. 2(*c*), the gap between the two is d2>d1.

Figure 3:
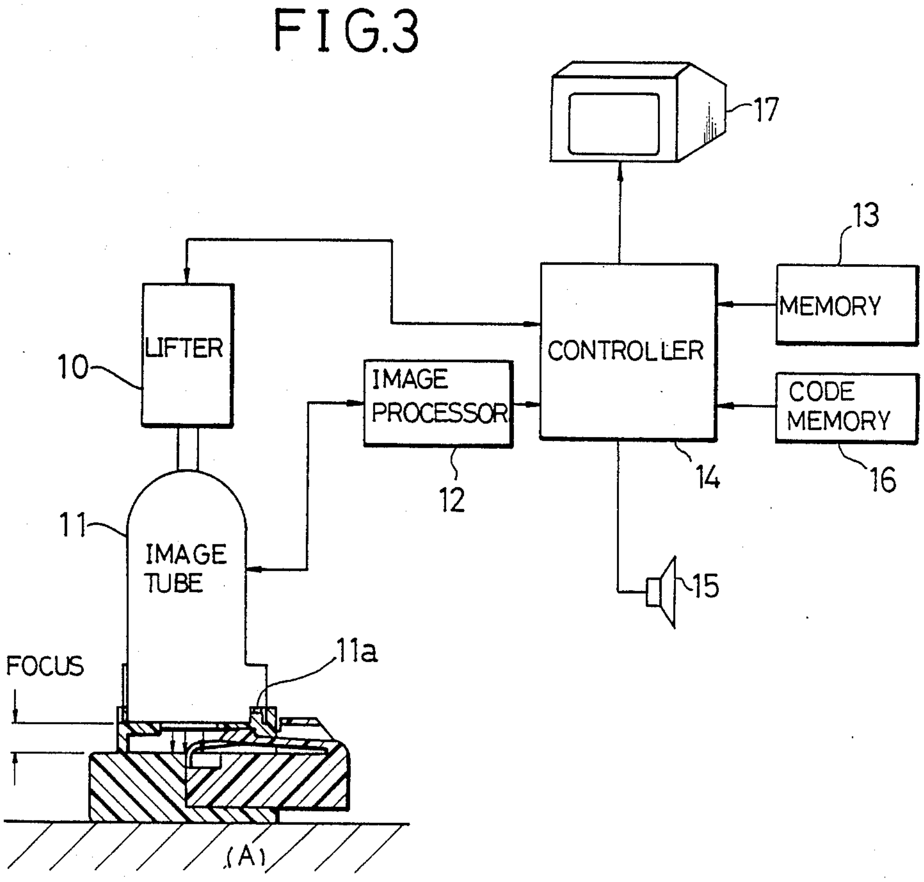
FIG. 3 is a schematic block diagram showing the system for inspecting connector coupling condition.

FIG. 3 shows a block diagram of the connector coupling condition inspecting system of the present invention, which comprises an image tube 11, a lifter for moving the image tube 11 up and down, an image processor 12 for processing image signals, detected through the image tube 11, a memory unit 13 for storing reference image patterns indicative of normal connector housing coupling conditions, a code memory 16 for storing various reference connector model code image patterns, a display unit 17, and a controller 14 connected to various elements for controlling the entire operation.

A number of connectors each composed of two matable connector housings are conveyed one by one under coupled condition on and along a manufacturing product conveyor. When one of them comes to a predetermined inspecting position (A), the coupled connector housings are stopped and located thereat with the square aperture la set upward. Since this inspecting position can be detected by an appropriate sensor, the inspecting system starts to inspect the connector coupling condition.

That is, the image tube 11 comes down into the recessed portion 3 of the female connector housing 1 by the lifter 10. Since the outer diameter of the lower end surface of the image tube 11 matches the inner diameter of the recessed portion 3, the lower end surface of the image tube 11 is engaged with the recessed portion 3. In addition, since a starter switch **11*a* is attached to the lower end of the image tube 11, this starter switch 11*a* is turned on by the dowel 1*c* of the female connector housing 1** in order to start the inspection operation.

Figure 5:
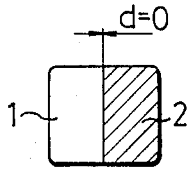
FIGS. 5(*a*), (*b*) and (*c*) show illustrations for assistance in explaining image patterns indicative of different connector coupling conditions.
Figure 5:
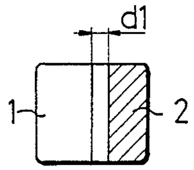
Figure 5:
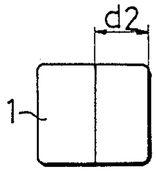

Therefore, the image tube 11 takes an image representative of the connector housing coupling condition. When the two housings 1 and 2 are coupled normally, the image must be the one as shown in FIG. 5(*a*); when coupled abnormally, the image must be the ones as shown in FIGS. 5(*b*) and (*c*).

The detected image signals are processed by an image processor 12 and the processed image signals are supplied to the controller 14. Where necessary, it is also possible to display the detected image as shown in FIG. 5(*a*), (*b*) or (*c*) on the display unit (e.g. CRT) 17.

On the other hand, since the memory 13 stores reference patterns indicative of standard connector housing coupling condition, the controller 14 can discriminate whether the detected connector housing coupling condition is normal or abnormal by comparing the image detected by the image tube with the reference patterns stored in the first memory unit 13.

When the inspecting system detects that the coupling condition is abnormal, the controller 14 produces an alarm through an alarm generator 15. Under these conditions, it is possible to remove the abnormal connector from the conveyor automatically or manually.

Further, since an image of the code groove 6 of the male housing 2 can also be detected by the image tube 11, the controller 14 can detect a model code of the connector now being inspected by comparing the detected groove image with the reference connector model code patterns stored in the code memory unit 16. Three examples of the grooves 6 indicative of connector model codes are shown in FIGS. 6(*a*), (*b*) and (*c*) by way of examples.

Since the model code of the connectors now being inspected can be detected, it is possible to remove connectors of different model codes from the conveyor or to display the total number of the connectors inspected as being normal, where necessary.

Figure 4:
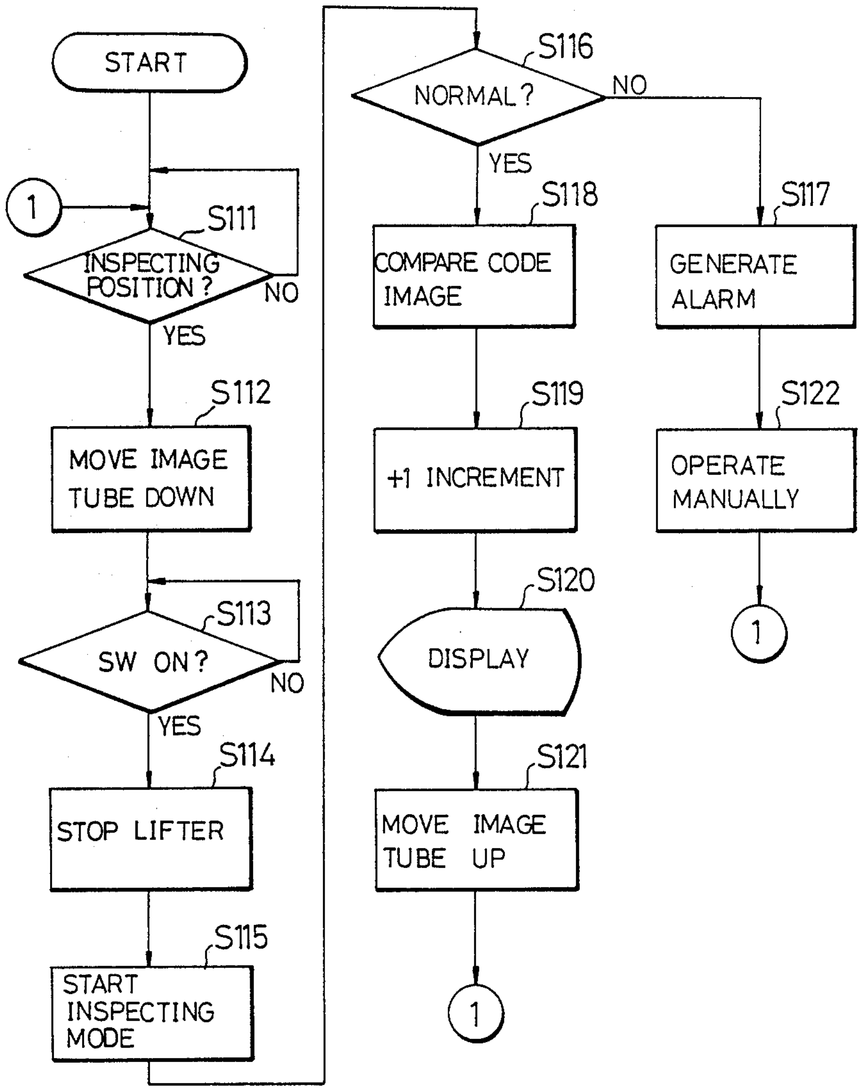
FIG. 4 is a flowchart for explaining the operation of the system shown in FIG. 3.

With reference to a flowchart shown in FIG. 4, the system operation will be described hereinbelow.

When controller 14 detects that a coupled connector comes to an inspecting position A by a position sensor (not shown) (in step 111), controller 14 moves the image tube downward by the lifter 10 so that the lowermost end surface of the image tube 11 is fitted and brought into contact with the recessed portion 3 of the female connector housing 1 (in step 112). When the image tube 11 is moved down, the starter switch **11*a* provided at the lower end of the image tube 11 is turned on by the dowel 1*c* of the female connector housing 1. Therefore, controller 14 checks whether the starter switch 11*a* is turned on (in step 113). If turned on, the lifter 10 stops moving the image tube. Under these conditions, since the image tube 11 is set at a position a predetermined focus distance away from the coupled connector housing, controller 14 start to activate the inspection mode (in step 115). Under the inspection mode, controller 14** detects one image indicative of coupling condition as shown in FIGS. 5(*c*), (*b*) and (*c*) and the same image indicative of a connector model code as shown in FIGS. 6(*a*), (*b*) and (*c*). These detected images are supplied to the controller 14 via the image processor 12. The controller 14 compares the detected coupling condition image with the reference patterns stored in the memory 13. Controller 14 checks whether the detected image is normal (in step 116). If normal, controller 14 compares the detected code image with reference pattern stored in the code memory 16 to determine the connector model code now being inspected (in step 118), and then increments the number of connectors inspected as being normal for each detected connector model code (in step 119). The coupling condition image and the incremented number (indicative of the total number of connectors coupled normally) are displayed on the CRT (in step 120). Thereafter, controller 14 moves the image tube 11 upward (in step 121), and returns to the step 111. Further, when the controller 14 detects that the detected image is abnormal as shown in FIGS. 5(*b*) and 5(*c*) (in step 116), controller 14 generates an alarm (in step 117) and allows the system to operate in manual mode, for instance (in step 122), returning to the step 111 again.

Further, when an alarm is produced (in step 117), it is also possible to automatically remove the abnormal connector from the conveyor by an appropriate mechanism. On the other hand, connectors coupled normally are conveyed to the succeeding process.

As described above, in the connector coupling condition inspecting system of the present invention, since the image tube can be automatically located accurately at a predetermined focus position (a focus distance) away from the connector coupled position in accordance with the recessed guide portion of the female connector housing, it is possible to obtain a clear image indicative of connector coupling condition without providing an expensive image tube locating mechanism. Further, since the detected image indicative of connector coupling conditions is compared with previously-stored reference patterns, it is possible to automatically determine the connector coupling condition reliably.

What is claimed is:

1. A connector coupling condition inspecting system, which comprises:

(a) a pair of matable connector housings constituting a connector, one of said housings being formed with a guide recessed portion on an upper surface thereof and an aperture at a center of the guide recessed portion through which connector housing coupling condition can be seen;

(b) an image tube, movably fitted and brought into contact with the guide recessed portion of said housing, for taking an image representative of connector coupling condition through the aperture;

(c) a first memory unit for storing reference patterns indicative of normal connector housing coupling conditions;

(d) a controller, connected to said image tube and said first memory unit, for comparing an image detected by said image tube with the reference patterns stored in said first memory unit to check whether said matable connector housings are coupled normally.

2. The connector coupling condition inspecting system of claim 1, which further comprises:

(a) at least one groove indicative of a model code of the connector to be inspected, said groove being formed in one of said connector housings; and (b) a second memory unit, connected to said controller, for storing code patterns indicative of connector model codes, said controller comparing an image detected by said image tube with the code patterns stored in said second memory unit to check the model code of said matable connector housings now being inspected.

3. The connector coupling condition inspecting system of claim 1, which further comprises an alarm generator for generating an alarm, when said controller detects that said matable connector housings are coupled abnormally, to remove an abnormally coupled connector manually or automatically.

4. The connector coupling condition inspecting system of claim 1, which further comprises an actuator disposed in or near the guide recessed portion to turn on a switch provided for a lower end of said image tube to start an inspection operation, whenever said image tube is fitted to the guide recessed portion of said connector housing.

5. The connector coupling condition inspecting system of claim 2, which further comprises a display unit, connected to said controller, for displaying a connector coupling condition detected by said image tube and the total number of connectors inspected as being normal on the basis of the detected model code.

6. A method of inspecting a coupling condition of a pair of matable connector housings, which comprises the steps of:

(a) forming guide recessed portion on an upper surface of one of the matable connector housings and an aperture at a center of the guide recessed portion through which connector housing coupling condition can be seen;

(b) lowering an image tube so that a lower end portion of the image tube is brought into contact with the guide recessed portion;

(c) taking an image representative of connector coupling condition through the aperture by the image tube;

(d) comparing the image detected by the image tube with reference patterns to check whether the matable connector housings are coupled normally; and (e) generating an alarm when the connector housings are coupled abnormally.

7. The method of claim 6, which further comprises:

(a) forming at least one groove indicative of a model code of the connector to be inspected on an upper surface of one of the matable connector housings;

(b) taking an image of the at least one groove indicative of a connector model code;

(c) comparing the image detected by the image tube with reference code patterns to check the model code of said matable connector housings now being inspected;

(d) counting the number of the connector housings coupled normally on the basis of the detected connector model code; and (e) displaying the number of the connector housings coupled normally for each connector model code.

* * * * *